(12) United States Patent
Ho

(10) Patent No.: US 6,171,563 B1
(45) Date of Patent: Jan. 9, 2001

(54) SUPPORTED LIQUID MEMBRANE PROCESS FOR CHROMIUM REMOVAL AND RECOVERY

(75) Inventor: W. S. Winston Ho, Annandale, NJ (US)

(73) Assignee: Commodore Separation Technologies, Inc., Kennesaw, GA (US)

( * ) Notice: Under 35 U.S.C. 154(b), the term of this patent shall be extended for 0 days.

(21) Appl. No.: 09/235,044

(22) Filed: Jan. 21, 1999

(51) Int. Cl.[7] .......................... C01G 37/00; B01D 15/04
(52) U.S. Cl. .......................... 423/54; 210/638; 210/643
(58) Field of Search .............................. 423/54; 210/638, 210/643

(56) References Cited

U.S. PATENT DOCUMENTS 4,051,230 * 9/1977 Miyauchi .......................... 423/658.5
4,956,154 * 9/1990 Magdics et al. ........................ 423/54

OTHER PUBLICATIONS

Chaudry, et al., "Supported Liquid Membrane Technique Applicability for Removal of Chromium from Tannery Wastes," *Waste Management*, vol. 17, No. 4, pp. 211–218 (1997).

Chiarizia, Application of Supported Liquid Membranes for Removal of Nitrate, Technetium (VII) and Chromium (VI) from Groundwater, *J. Membr. Sci.*, vol. 55, pp. 39–64 (1991).

Chiarizia, et al, "Removal of Inorganic Contaminants from Groundwater, Use of Supported Liquid Membranes," *Environmental Remediation: Removing Organic and Metal Ion Pollutants*, ACS Symposium Series 509, American Chemical Society, Washington, D.C. pp. 22–33 (1992).

Chiarizia, "Stability of Supported Liquid Membranes Containing Long–chain Aliphatic Amines as Carriers," *J. of Memb. Sci*, vol. 55, pp. 65–77 (1991).

Hodgson, et al., "Demonstration of Technologies to Remove Contamination from Groundwater," Proceedings of the Third International Conference on New Frontiers for Hazardous Waste Management, Westinghouse Hanford Co., Richland, WA (U.S.), Report No. CONF–890927, pp. 26–34 (Sep. 10–13, 1989).

Loiacono, et al., "Metal Ion Separation and Concentration with Supported Liquid Membranes," *J. Membr. Sci.*, vol. 28, No. 2, pp. 123–138 (1986).

Molinari, et al., "Stability and Effect of Diluents in Supported Liquid Membranes for CR (III), CR (VI), and CD (II) Recovery," *Sep. Sci. Technol.*, vol. 24, No. 12, pp. 1015–1032 (1989).

* cited by examiner

*Primary Examiner*—Steven Bos
(74) *Attorney, Agent, or Firm*—Kilpatrick Stockton LLP

(57) ABSTRACT

The present invention is directed toward a two-step process for the removal and recovery of chromium from a feed solution, such as waste water, using supported liquid membranes (SLMs). In the first step of the process, the feed solution, which contains hexavalent chromium, is treated with a first strip solution to produce a moderately concentrated Cr(VI) solution. In the second step, the moderately concentrated Cr(VI) solution is treated with a second strip solution. The process advantageously produces a treated feed solution having a decreased concentration of chromium which is acceptable for discharge or recycle and a product solution which contains a highly concentrated Cr(VI) solution having little or no sulfate contaminants.

31 Claims, 4 Drawing Sheets

SUPPORTED LIQUID MEMBRANE PROCESS FOR CHROMIUM REMOVAL AND RECOVERY

FIELD OF THE INVENTION

The present invention relates to a supported liquid membrane process that is useful for removal and recovery of chromium from waste waters and process streams.

BACKGROUND OF THE INVENTION

Liquid membranes combine extraction and stripping, which are normally carried out in two separate steps in conventional processes such as solvent extractions, into one step. A one-step liquid membrane process provides the maximum driving force for the separation of a targeted species, leading to the best clean-up and recovery of the species (W. S. Winston Ho and Kamalesh K. Sirkar, eds., *Membrane Handbook*, Chapman & Hall, New York, 1992).

There are two types of liquid membranes: (1) supported liquid membranes (SLMs) and (2) emulsion liquid membranes (ELMs). In SLMs, the liquid membrane phase is the organic liquid imbedded in pores of a microporous support, e.g., microporous polypropylene hollow fibers (W. S. Winston Ho and Kamalesh K. Sirkar, eds., *Membrane Handbook*, Chapman & Hall, New York, 1992). When the organic liquid contacts the microporous support, it readily wets the pores of the support, and the SLM is formed. ELMs are usually prepared by first forming an emulsion between two immiscible phases, and then dispersing the emulsion in a third (continuous) phase by agitation for extraction. The membrane phase is the liquid phase that separates the encapsulated, internal droplets in the emulsion from the external, continuous phase (W. S. Winston Ho and Kamalesh K. Sirkar, eds., *Membrane Handbook*, Chapman & Hall, New York, 1992).

The use of liquid membranes to remove chromium from wastewaters has long been pursued by the scientific and industrial community (W. S. Winston Ho and Kamalesh K. Sirkar, eds., *Membrane Handbook*, Chapman & Hall, New York, 1992; J. W. Frankenfeld and N. N. Li in N. N. Li, ed., *Recent Developments in Separation Science*, pp. 285–292, CRC Press, Boca Raton, Fla., 1977; E. J. Fuller and N. N. Li, *J. Membrane Sci.*, 18, 251 (1984); A. I. Alonso and C. C. Pantelides, *J. Membrane Sci.*, 110, 151 (1996)). Nonetheless, there remains a need for a process that not only can remove chromium but also can recover it.

The chromium recovered in high concentration is desirable for reuse or resale. For example, a highly concentrated chromium solution containing at least 15 wt. % hexavalent chromium (Cr(VI)), e.g., 46.7 wt. % $Na_2CrO_4$, and less than 10 wt. % $Na_2SO_4$ is a useful form of a product for reuse or resale.

It is an object of the present invention to provide a novel supported liquid membrane process that not only removes chromium to an acceptable level in the treated water suitable for discharge or recycle but also recovers the chromium in a usable form for reuse or resale. This process not only solves the environmental problem but also recovers the chromium.

SUMMARY OF THE INVENTION

The present invention is directed toward a process using a supported liquid membrane comprising two steps: (1) a feed solution containing hexavalent chromium (Cr(VI)) is treated to decrease the chromium to an acceptable level for discharge or recycle with a strip solution which results in a moderately concentrated Cr(VI) and (2) the resulting strip solution is then processed to decrease Cr(VI) to a concentration similar to that in the feed solution in Step (1), for recycling back to the feed solution in Step (1), by the use of a new strip solution which results in a highly concentrated Cr(VI) solution, said supported liquid membrane comprising an amine. The highly concentrated Cr(VI) solution is a product of this process which contains no sulfate or a low level of sulfate and is suitable for reuse or resale. Therefore, this process not only solves the environmental problem but also recovers the chromium.

DETAILED DESCRIPTION OF THE INVENTION

Figure 1:
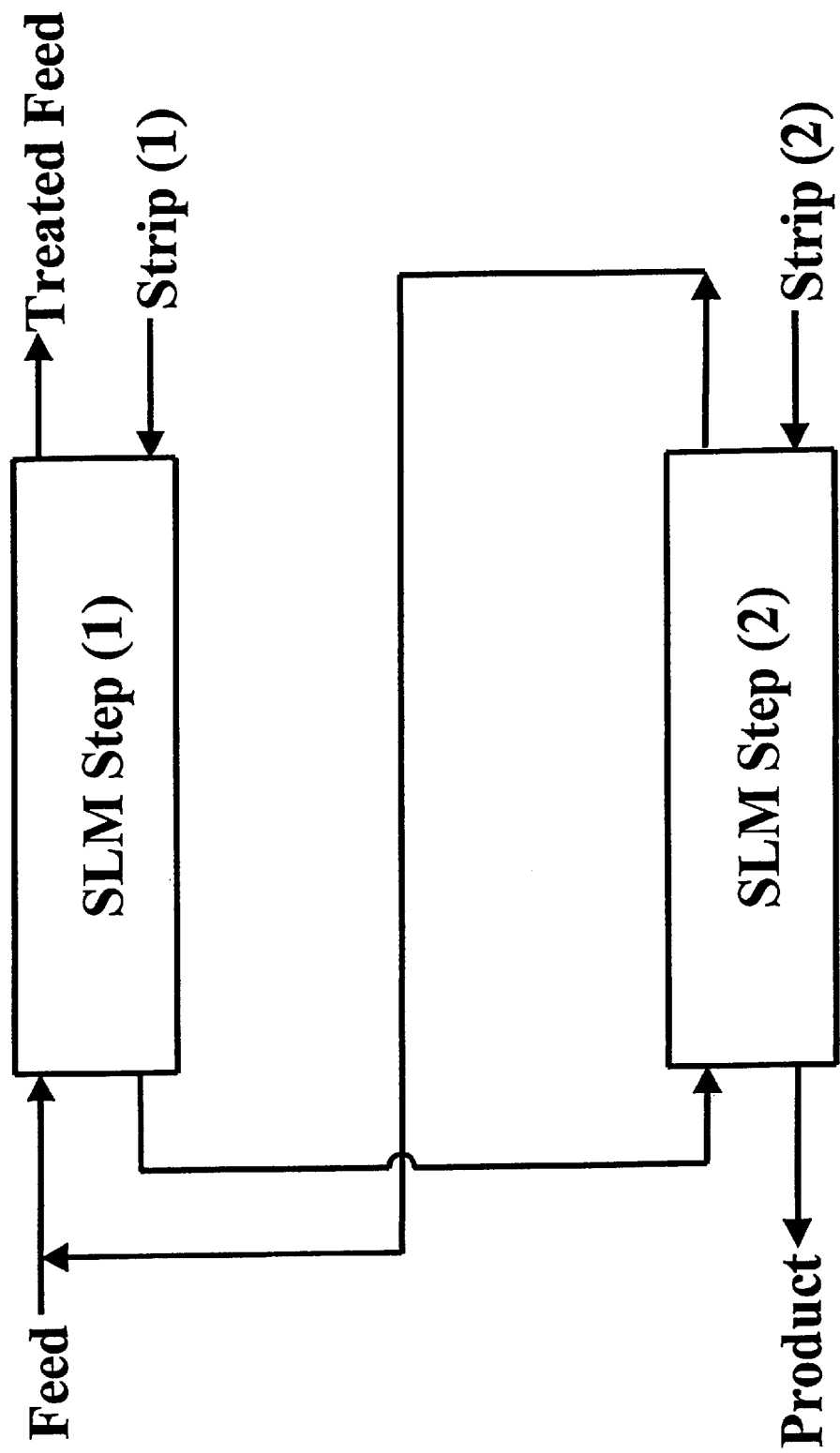
FIG. 1 is a schematic diagram of the process of the present invention comprising two supported liquid membrane (SLM) steps.

The process of the present invention comprises two supported liquid membrane (SLM) steps: (1) a feed solution containing hexavalent chromium (Cr(VI)) is treated to decrease the chromium to an acceptable level for discharge or recycle with a strip solution (Strip (1)) which results in a moderately concentrated Cr(VI) solution and (2) the resulting Strip (1) solution is then processed to decrease Cr(VI) to a concentration similar to that in the feed solution in Step (1), for recycling back to the feed solution in Step (1), by the use of a new strip solution (Strip (2)) which results in a highly concentrated Cr(VI) solution. This process is shown schematically in FIG. 1.

In Step (1) of the process, the acceptable chromium level for discharge or recycle is, for example, 0.5 part per million (ppm) or lower. The moderately concentrated Cr(VI) solution comprises, for example, 1,000 ppm to 20,000 ppm Cr(VI). In Step (2) of the process, the resulting Strip (1) solution containing, for example, 1,000 ppm to 20,000 ppm Cr(VI) is pH adjusted by the use of an acid to an acidic condition (for example, a pH of 0.1 to 2) and processed as the feed by the SLM using Strip (2) solution. The Strip (2) solution results in a highly concentrated Cr(VI) solution, which comprises, for example, 50,000 ppm (5 wt. %) to 300,000 ppm (30 wt. %) Cr(VI). The highly concentrated Cr(VI) solution is a product of this process which contains no sulfate or a low level of sulfate (less than 100,000 ppm or 10 wt. %) and is suitable for reuse or resale. Therefore, this process not only solves the environmental problem but also recovers the chromium.

The SLM used in this process is an organic liquid comprising an amine, which is imbedded in pores of a microporous support. The amine includes a primary, secondary, tertiary amine or a mixture of two or more of primary, secondary and tertiary amines. Each amine has a total number of carbon atoms ranging from 8 to 42. Preferably, the total number of carbon atoms per amine molecule ranges from 16 to 32. More preferably, the total number of carbon atoms per amine molecule ranges from 22 to 28. The amine includes, for example, triisooctylamine, trioctylamine, trinonylamine, triisodecylamine, triundecylamine, trilaurylamine, diundecylamine, dilaurylamine, ditridecylamine, ditetradecylamine, the secondary amine with a molecular weight of 372 and a total number of 25.3 carbon atoms per amine molecule or a mixture thereof.

The organic liquid of the SLM optionally comprises a hydrocarbon solvent or mixture. The hydrocarbon solvent or mixture has a number of carbon atoms per solvent molecule ranging from 6 to 18, preferably from 10 to 14. The hydrocarbon solvent includes, for example, n-decane, n-undecane, n-dodecane, n-tridecane, n-tetradecane, isodecane, isoundecane, isododecane, isotridecane, isotetradecane, isoparaffinic hydrocarbon solvent (with a flash point of 92° C., a boiling point of 254° C., a viscosity of 3 cp (at 25° C.), and a density of 0.791 g/ml (at 15.6° C.)) or a mixture thereof.

The organic liquid of the SLM optionally contains a modifier to enhance the complexation of Cr(VI) with amine and to improve stripping. The modifier includes nitrophenyl alkyl ether, alcohol, trialkyl phosphate or a mixture thereof. The nitrophenyl ether includes, for example, o-nitrophenyl octyl ether (o-NPOE), o-nitrophenyl heptyl ether, o-nitrophenyl hexyl ether, o-nitrophenyl pentyl ether (o-NPPE), o-nitrophenyl butyl ether, o-nitrophenyl propyl ether or a mixture thereof. The alcohol includes, for example, hexanol, heptanol, octanol, nonanol, decanol, undecanol, dodecanol, tridecanol, tetradecanol, pentadecanol, hexadecanol, heptadecanol, octadecanol or a mixture thereof. The trialkyl phosphate includes, for example, tributyl phosphate, tris(2-ethylhexyl) phosphate or a mixture thereof.

The organic liquid of SLM comprises 2%–100% (approximately 0.05M–3M) amine and 0%–20% modifier in a hydrocarbon solvent or mixture. More preferably, the SLM comprises 5%–40% amine and 1%–10% modifier in a hydrocarbon solvent or mixture. All percentages are by weight unless specified otherwise.

The material of the microporous support comprises microporous polypropylene, polytetrafluoroethylene, polyethylene, polysulfone, polyethersulfone, polyetheretherketone, polyimide, polyamide or a mixture thereof.

The strip solution used in the process is aqueous and comprises a base in water. The base includes, for example, sodium hydroxide, potassium hydroxide, lithium hydroxide, ammonium hydroxide, rubidium hydroxide, cesium hydroxide, beryllium hydroxide, magnesium hydroxide, calcium hydroxide or a mixture thereof.

Alternatively, the strip solution used in the process is a dispersion of an aqueous strip solution in an organic liquid. The aqueous strip solution comprises a base, which includes the examples given above, in water. The organic liquid is the organic liquid of the SLMs described earlier. The strip dispersion is produced by the use of a dispersing device, which comprises a mechanical mixer, a high sheer mixer or an emulsifying device comprising a rotor—stator configuration. The continuous organic phase of the dispersion readily wets the pores of the microporous support, and a liquid membrane (the organic phase) supported in the microporous support is formed.

For the strip dispersion, the organic liquid optionally contains a surfactant. The surfactant includes, for example, nonionic polyisobutylene-polyamine, sorbitan monooleate (SPAN 80), sorbitan trioleate (SPAN 85), sorbitan tristearate (SPAN 65), sorbitan monostearate (SPAN 60), sorbitan monopalmitate (SPAN 40), sorbitan monolaurate (SPAN 20), polyoxyethylene sorbitan trioleate (TWEEN 85), polyoxyethylene sorbitan tristearate (TWEEN 65) or a mixture thereof.

A SLM containing an amine (e.g., $R_2NH$) can effectively remove Cr(VI), e.g., chromic acid, from wastewaters or aqueous solutions at acidic conditions (for example, pH 0.1–2). The SLM combines extraction and stripping into one step. The extraction is as follows:

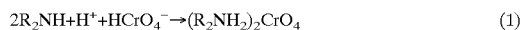
$$2R_2NH + H^+ + HCrO_4^- \rightarrow (R_2NH_2)_2CrO_4 \quad (1)$$

The stripping using sodium hydroxide is:

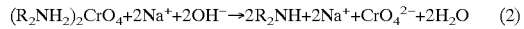
$$(R_2NH_2)_2CrO_4 + 2Na^+ + 2OH^- \rightarrow 2R_2NH + 2Na^+ + CrO_4^{2-} + 2H_2O \quad (2)$$

A flux of a species transported through the SLM is defined as follows:

$$\text{flux} = \frac{V \Delta C}{tA} \quad (3)$$

where V is the volume of the feed solution treated, $\Delta C$ the concentration change in the feed solution, t the time, and A the membrane surface area.

Figure 2:
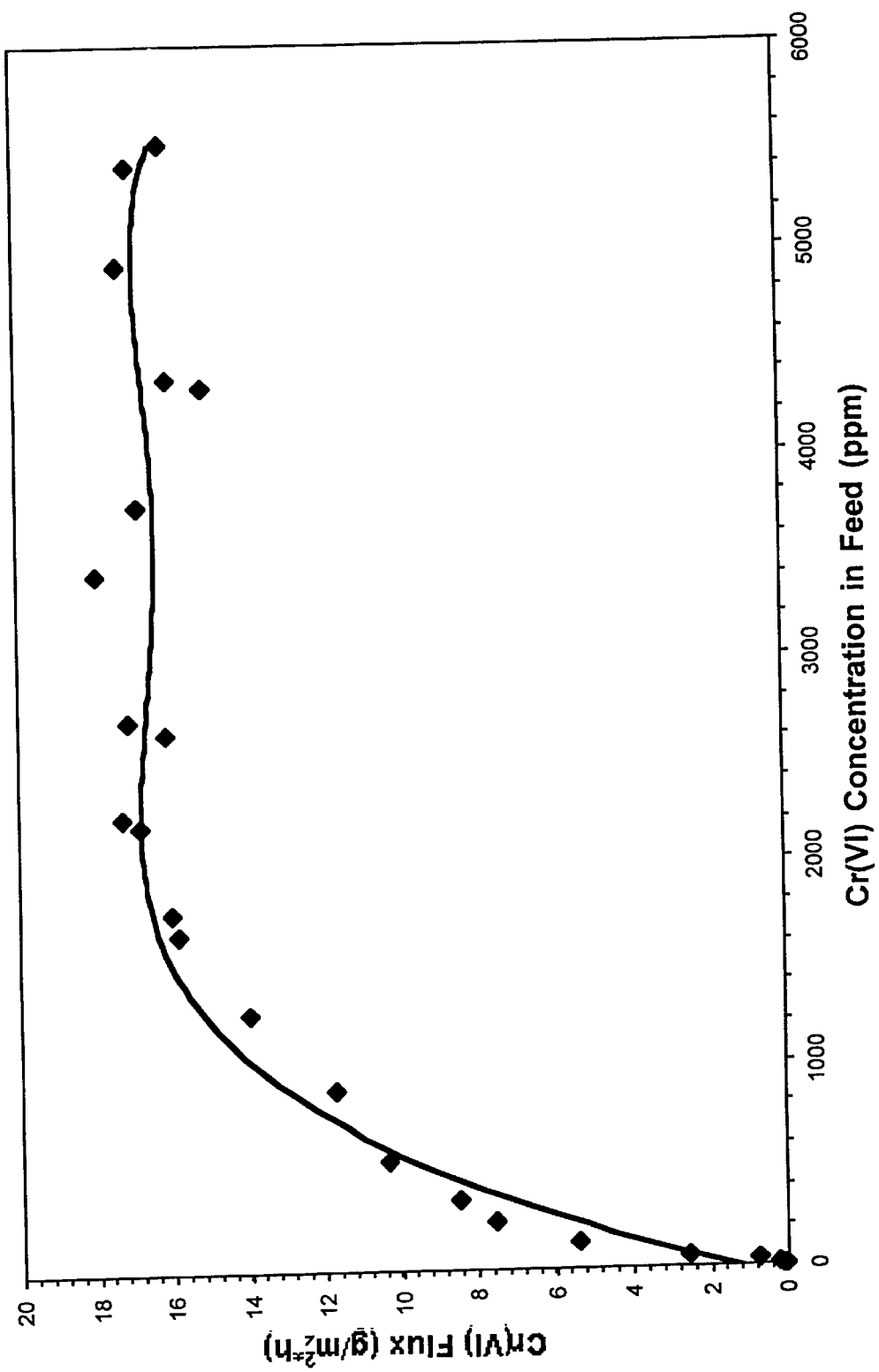
FIG. 2 shows Cr(VI) flux as a function of Cr(VI) concentration in the feed.

The flux of Cr(VI) through the SLM, comprising 1M of the secondary amine with a molecular weight of 372 (a total number of 25.3 carbon atoms per amine molecule) and 10 vol. % o-nitrophenyl octyl ether (o-NPOE) in n-dodecane, as a function of Cr(VI) concentration in the feed is shown in FIG. 2. As shown in this figure, a carrier saturation phenomenon with a constant flux for the facilitated transport mechanism becomes evident when the Cr(VI) concentration in the feed is about 2,000 ppm or greater.

An acid, for example, sulfuric acid, is used for the pH adjustment of the feed solution. However, the SLM also removes sulfuric acid in the similar mechanism:

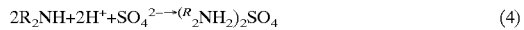
$$2R_2NH + 2H^+ + SO_4^{2-} \rightarrow (R_2NH_2)_2SO_4 \quad (4)$$

$$(R_2NH_2)_2SO_4 + 2Na^+ + 2OH^- \rightarrow 2R_2NH + 2Na^+ + SO_4^{2-} + 2H_2O \quad (5)$$

Thus, the sulfuric acid competes with the chromic acid in the feed solution for complexation with the amine in the SLM.

Figure 3:
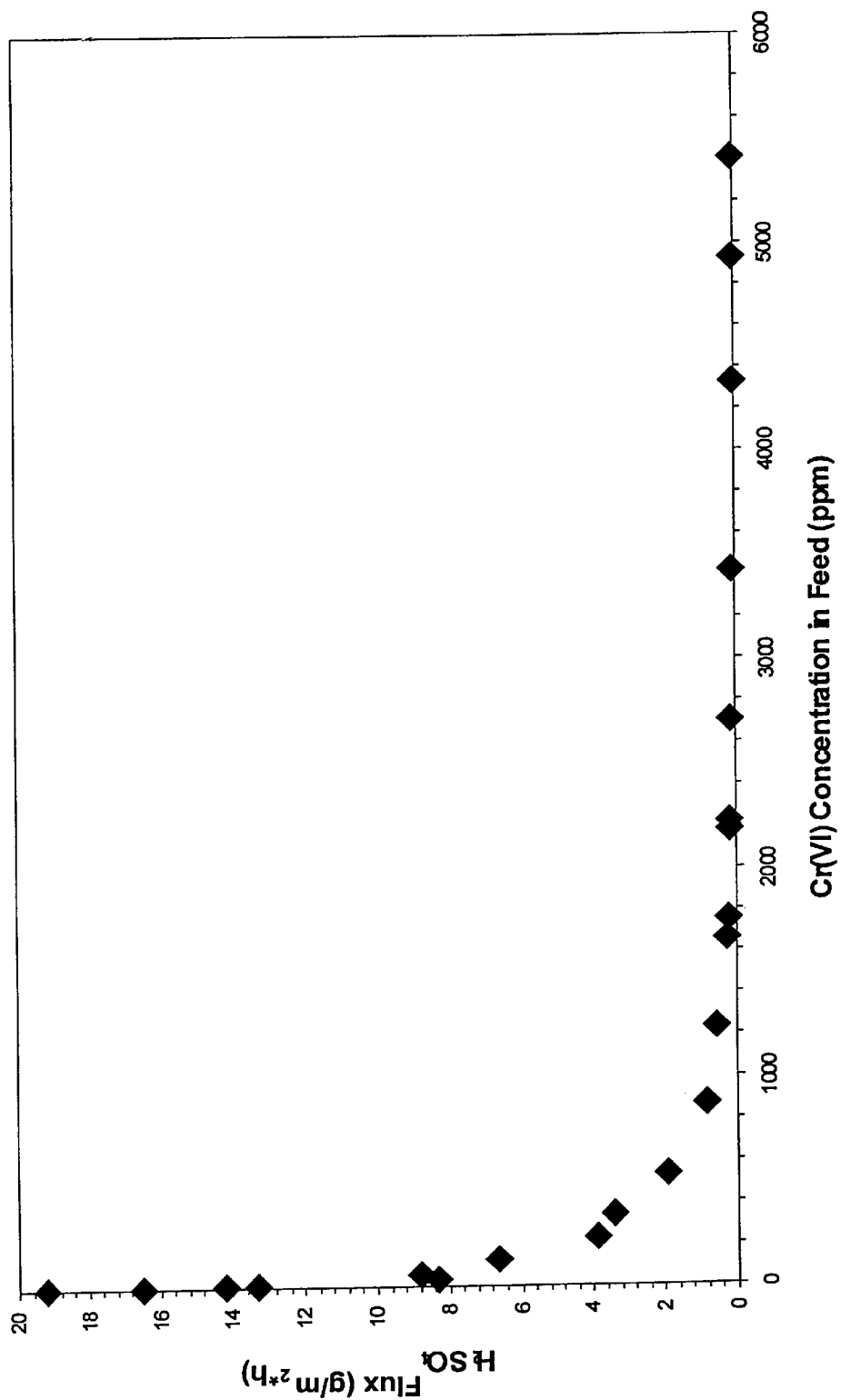
FIG. 3 exhibits sulfuric acid flux as a function of Cr(VI) concentration in the feed.

The extraction of sulfuric acid into the strip solution is not desirable since it degrades the quality of the chromate recovered in the strip solution. The sulfuric acid extracted is converted to sulfate in the strip solution containing a base (e.g., sodium hydroxide) according to Eq. (5). Sulfate is an impurity for the chromate recovered in the strip solution. However, we have unexpectedly found that the flux of sulfuric acid depends on the Cr(VI) concentration in the feed. FIG. 3 shows the sulfuric acid flux as a function of Cr(VI) concentration in the feed for the same SLM used for obtaining FIG. 2. The sulfuric acid flux reduces very significantly as the Cr(VI) concentration in the feed increases. The sulfuric acid flux for a Cr(VI) concentration of greater than about 100 ppm is much less than that for a lower concentration.

As mentioned earlier, the feed solution in Step (2) of the process of the present invention is a moderately concentrated Cr(VI) solution comprising 1,000 ppm to 20,000 ppm Cr(VI). In this Cr(VI) concentration range, the sulfuric acid flux is very low (as shown in FIG. 3). Thus, the resulting Strip (2) solution, i.e., the highly concentrated Cr(VI) solution (chromate) and the final product of the process, has a low sulfate concentration, giving the high quality of the chromate product.

The selectivity of chromic acid vs. sulfuric acid may be defined as:

$$H_2CrO_4/H_2SO_4 \text{ selectivity} = \frac{H_2CrO_4 \text{ flux}/H_2SO_4 \text{ flux}}{H_2CrO_4/H_2SO_4 \text{ conc. ratio in the feed}} \quad (6)$$

Figure 4:
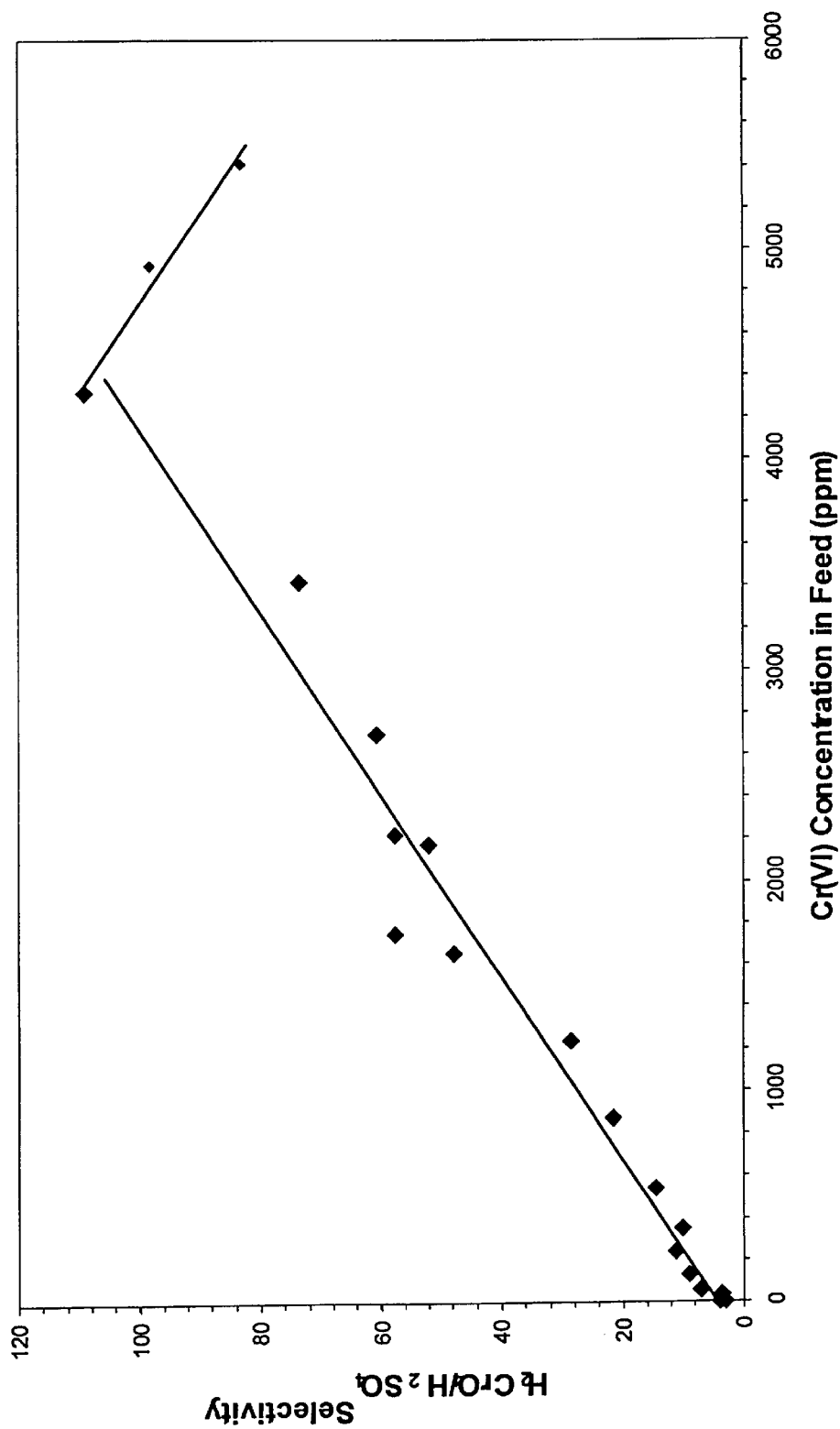
FIG. 4 gives chromic acid/sulfuric acid selectivity as a function of Cr(VI) concentration in the feed.

We have found that the selectively is governed by the Cr(VI) concentration in the feed. FIG. 4 gives the selectivity as a function of Cr(VI) concentration in the feed for the same SLM used for obtaining FIGS. 2 and 3. The selectivity increases from about 3 to 110 as the feed Cr(VI) concentration increases from 0 to about 4,300 ppm. For a higher concentration, the selectivity reduces as the constant Cr(VI) flux (at the carrier saturation) is divided by the higher Cr(VI) concentration as shown in Eq. (6). For the feed solution in Step (2) of the process of the present invention containing 1,000 ppm to 20,000 ppm Cr(VI), the selectivity of chromic acid vs. sulfuric acid is high.

The present invention will be better understood by reference to the following examples which are offered by way of illustration and not limitation. In the examples, the chromium and sulfate concentrations in the feed and strip solutions were analyzed by the use of an inductively coupled plasma (ICP) atomic emission spectrometer (AES), which was a Liberty 220 ICP-AES. The sulfate concentration was based on the analysis of sulfur.

EXAMPLE 1

Supported Liquid Membrane Step (1) of the Process

An aqueous feed stream at a flow rate of 4.5 gallon/min (gpm) containing 253 parts per million (ppm) hexavalent chromium (Cr(VI)) was treated by the use of 4 supported liquid membrane (SLM) modules, which were commercial-size, 10" (inch) diameter by 28" (inch) long modules, in the single-pass (once-through) mode of operation. Each module offered a mass transfer surface area of 135 m² and 225,000 microporous polypropylene hollow fibers. Each hollow fiber had an outside diameter of 300 micrometers and an inside diameter of 244 micrometers. The microporous hollow fiber had a porosity of approximately 40% and a pore size of 0.03 micrometer.

In the single-pass mode, a feed solution was pumped through a membrane module or a series of modules in single passes, with the strip solution run in the recycle mode. A single pass was defined as passing the entire feed volume through the module or modules, collecting it in a separate container, and then passing the entire collected feed volume through the module or modules in the next pass. The cycle repeated itself until the effluent concentration targets were met.

The organic liquid of the SLM comprised 1M of the secondary amine with a molecular weight of 372 (a total number of 25.3 carbon atoms per amine molecule) and 10 vol. % o-nitrophenyl octyl ether (o-NPOE) in n-dodecane. The Cr(VI) concentration in the feed stream was reduced to below a detection limit of 0.05 ppm in the effluent, which is suitable for discharge or recycle.

The strip solution used was 200 gallons of an aqueous solution of 2.5M sodium hydroxide. The strip solution was run in the recycle mode at a flow rate of 40 gpm. The Cr(VI) concentration in the strip solution increased from zero in the beginning to 5,200 ppm at 14 hours into the run. At 21 hours into the run, the concentration increased to 7,700 ppm. This run constituted the SLM Step (1) of the process of the present invention.

EXAMPLE 2

Supported Liquid Membrane Step (2) of the Process Using 12 M NaOH Strip Solution (Feed in Recycle Mode)

The pH value of a sample of the strip solution from Example 1 was adjusted to pH 1.5 by the use of sulfuric acid. The resulting solution of pH 1.5 contained 5,792 ppm Cr(VI), 129,830 ppm sulfate, and 68,273 ppm sodium. This solution was used as the feed for Step (2) of the process.

The feed solution in a volume of 45 gallons was processed in Step (2) of the process by the use of 4 SLM modules, which were 2.5" diameter by 8" long modules. Each module had a surface area of 1.4 m² and contained 10,000 microporous polypropylene hollow fibers. The hollow fiber had the same outside and inside diameters and pore characteristics as those for the 10" diameter modules described earlier. The SLM comprised 1M of the secondary amine with a molecular weight of 372 (a total number of 25.3 carbon atoms per amine molecule) and 10 vol. % o-NPOE in n-dodecane, which had the same composition of the organic liquid as the SLM used in Example 1. The four modules were connected in series.

The strip solution was 3 liters of 12M NaOH. The flow rate of the feed solution was 0.84 liter/min., and the flow rate of the strip solution was 1.6 liters/min. Both the feed and strip solutions were run in the recycle mode of operation.

In the recycle mode, a feed solution was pumped from a feed reservoir, through a membrane module or a series of modules and back to the feed reservoir where it was reintroduced into the module. A strip solution was also run in the recycle mode. The feed and strip solutions flowed in countercurrent mode Concentrated sulfuric acid was added to the feed solution to maintain a pH of 1.5. At 1,080 minutes into the run, 250 ml of 50 wt. % NaOH solution was added to the strip solution. At the end of the run, i.e., 1,200 minutes into the run, the Cr(VI) concentration in the feed was reduced to 689 ppm, which was suitable for blending with the feed solution in Step (1) of the process (As mentioned earlier, the feed solution in Step (1) of the process was treated in Step (1) of the process.). The Cr(VI) concentration in the final, resulting strip solution was 195,019 ppm, which was very high and equivalent to 60.7 wt. % $Na_2CrO_4$. The sulfate concentration in the strip solution was only 7,575 ppm, which was much lower than the specification of 10 wt. % (100,000 ppm) for reuse or resale. Thus, the quality of the strip solution obtained was very good for reuse or resale. This run constituted the SLM Step (2) of the process of the present invention.

The high sulfate concentration (129,830 ppm) in the feed solution can drive the reaction according to Eq. (4) to compete with the chromium reaction according to Eq. (1). As mentioned earlier, the extraction of sulfuric acid (sulfate) into the strip solution is not desirable since the presence of sulfate in the strip solution degrades the quality of the chromate recovered in the strip solution. However, we have found an unexpectedly high selectivity of chromium (Cr (VI)) vs. sulfate for a feed Cr(VI) concentration greater than about 100 ppm, on which the SLM process of the present invention is based. Based on the high selectivity, the process yields a high quality product of the strip solution containing a high concentration of Cr(VI), for example, approximately 15 wt. % Cr(VI) (46.7 wt. % $Na_2CrO_4$) or greater, and a low concentration of sulfate (less than 10 wt. %).

As mentioned above, the Cr(VI) concentration in the feed was 689 ppm at the end of the run (1,200 minutes into the run). The sulfate concentration in the feed was approximately 129,830 ppm. The fluxes of Cr(VI) (chromic acid) and sulfate (sulfuric acid) through the SLM were determined via Eq. (3) (8.14 $g/m^2 \cdot h$ and 0.298 $g/m^2 \cdot h$, respectively). The selectivity of chromium (Cr(VI)) vs. sulfate was determined by the use of Eq. (6) to be 5,137, which is unexpectedly high. The selectivity of chromium vs. sulfuric acid was determined also via Eq. (6) (using 1,500 ppm sulfuric acid at pH 1.5) to be 59, which is quite high. Together with the high selectivities, the Cr(VI) flux (8.14 $g/m^2 \cdot h$) was not affected significantly by the high sulfate concentration (129, 830 ppm). Thus, the process of the present invention yielded the final strip solution product suitable for reuse or resale.

EXAMPLE 3

Supported Liquid Membrane Step (2) of the Process Using 13.6M NaOH Strip Solution (Feed in Recycle Mode)

An aqueous feed solution contained 6,300 ppm Cr(VI) and 600 ppm Cr(III), and it had an initial pH of 1.2. This feed solution in a volume of 40 gallons was treated by the use of 4 SLM modules used in Example 2, in the recycle mode of operation described in Example 2. The SLM had the same composition of the organic liquid used in Examples 1 and 2. The four modules were connected in series, with the feed and strip solutions flowing in counter current mode. The strip solution was 2.1 liters of aqueous 13.6 M NaOH solution. In a similar way as the feed solution, the strip solution was run in recycle mode. The feed solution flow rate was 0.84 liter/min, and the strip solution flow rate was 1.6 liters/min. Concentrated sulfuric acid was added to the feed solution to maintain a pH of 1.5. The Cr(VI) concentration in the feed solution was decreased to 3,149 ppm at 510 minutes into the run. At this time, the Cr(VI) concentration in the strip solution was 197,325 ppm, which is equivalent to 61.5 wt. % $Na_2CrO_4$ and suitable for reuse or resale.

EXAMPLE 4

Supported Liquid Membrane Step (2) of the Process Using 13.6 M NaOH Strip Solution (Feed in Single-Pass Mode)

An aqueous feed solution had 6,360 ppm Cr(VI), 504 ppm Cr(III), and an initial pH of 1.2. This feed solution in a 30-gallon volume was processed by the use of the 4 SLM modules used in Examples 2 and 3, in the single-pass mode of operation described in Example 1. The SLM had the same composition of the organic liquid used in Examples 1–3. The four modules were connected in series, with the feed and strip solutions flowing in the countercurrent mode. The feed solution in single-pass mode had a flow rate of 0.8–0.9 liter/min.

The strip solution was 2.1 liters of 13.6 M NaOH, and it was run in recycle mode at a flow rate of 1.5–3.0 liters/min. The strip solution flow rate was varied to achieve a higher strip inlet pressure. The strip inlet pressure was started at 4 psi and increased, to a maximum of 7 psi, during the passes as the solution level in the strip vessel started rising. The pH of the feed solution was adjusted between each pass using concentrated sulfuric acid to maintain the starting pH below 1.4. Each pass took a run time of 126–142 minutes. At the end of the seventh pass, the Cr(VI) concentration in the treated feed solution was 1,108 ppm, and that in the final strip solution was 165,928 ppm, which is equivalent to 51.7% $Na_2CrO_4$. The sulfate concentration in the strip solution was 9,119 ppm, which was much lower than the specification of 10 wt. % (100,000 ppm). The quality of the strip solution was high enough for reuse or resale.

EXAMPLE 5

Supported Liquid Membrane Step (2) of the Process Using 15 M NaOH Strip Solution (Feed in Single-Pass Mode)

An aqueous feed solution contained 6,360 ppm Cr(VI) and 600 ppm Cr(III), and it had an initial pH of 1.2. This feed solution in a volume of 30 gallons was treated by the use of the 4 SLM modules used in Examples 2–4, in the single-pass mode of operation described in Example 1. The SLM had the same composition of the organic liquid used in Examples 1–4. The four modules were connected in series, with the feed and strip solutions flowing in countercurrent mode. The feed solution flow rate was 0.84 liter/min.

The strip solution was 2 liters of 15 M NaOH, and it was run in recycle mode at a flow rate of 1.5–1.7 liters/min, which was adjusted to maintain a strip inlet pressure of 4 psi initially. The strip inlet pressure was increased gradually to 6.25 psi at the end of the run to minimize the osmotic transfer of water from the feed solution to the strip solution. The feed inlet pressure was 2.5–4.0 psi, and the feed outlet pressure was 0.5–1.0 psi. Concentrated sulfuric acid was added to the feed solution to maintain an inlet pH below 1.5 for each pass. The run time for each pass at the feed flow rate of 0.84 liter/min was 135 minutes. At the end of the sixth pass, the Cr(VI) in the treated feed solution was 800 ppm, which was suitable for blending with the feed solution in Step (1) of the process (As mentioned earlier, the feed solution in Step (1) of the process was treated in Step (1) of the process.). The Cr(VI) concentration in the final, resulting strip solution was 162,910 ppm, which is equivalent to 50.7% $Na_2Cr_4$. The sulfate concentration in the strip solution was only 5,194 ppm, which was much lower than the specification of 10 wt. % (100,000 ppm). Thus, the strip solution was suitable for reuse or resale.

EXAMPLE 6

Supported Liquid Membrane Step (2) of the Process Using 8.14 M NaOH Strip Solution (Feed in Single-Pass Mode)

An aqueous feed solution had 6,540 ppm Cr(VI), 600 ppm Cr(III), and an initial pH of 1.25. This feed solution in a 30-gallon volume was treated in Step (2) of the process using the 4 SLM modules employed in Examples 2–5, in the single-pass mode of operation described in Example 1. The SLM had the same composition of the organic liquid used in Examples 1–5. The four modules were connected in series, with the feed and strip solutions flowing in countercurrent mode. The feed solution was run at a flow rate of approximately 0.84 liter/min. in the single-pass mode of operation. Each pass took approximately 135 minutes (2.25 hours).

The strip solution was initially made up with half of the mass of NaOH necessary for 2.1 liters of 13.6 M NaOH and all of the water, i.e., the initial strip solution was 1.75 liters of 8.14 M NaOH. After the second pass (for a total processing time of 4.5 hours) was completed, the remaining NaOH (571 g) was added to the strip solution. The strip solution was run in recycle mode at a flow rate of 1.5–2.0 liters/min. The strip inlet pressure was started at 6 psi, and it was increased, to a maximum of 7.5 psi, during the passes as the solution level in the strip vessel started rising. The pH of the feed solution was adjusted between each pass by the use of concentrated sulfuric acid to maintain the starting pH below 1.3 for each pass. At the end of the fourth pass (for a total processing time of 9 hours), the Cr(VI) concentration in the treated feed solution was 712 ppm, which was suitable for blending with the feed solution in Step (1) of the process (As mentioned earlier, the feed solution in Step (1) of the process was treated in Step (1) of the process.). The Cr(VI) concentration in the final strip solution was 168, 448 ppm, which is equivalent to 52.5% $Na_2CrO_4$. The sulfate concentration in this strip solution was approximately 2,700 ppm, which was much lower than the specification of 10 wt. % (100,000 ppm). Thus, the quality of this strip solution was good enough for reuse or resale.

EXAMPLE 7

Chromium Flux, Sulfuric Acid Flux and Chromic Acid/Sulfuric Acid Selectivity

A set of experiments was carried out to determine the flux of Cr(VI) (chromic acid), the flux of sulfuric acid, and the selectivity of chromic acid vs. sulfuric acid through the SLM with the same composition of the organic liquid used in Example 1–7. For the experiments, a 2.5" diameter by 8" long module containing the microporous polypropylene hollow fibers described earlier was loaded with a freshly prepared organic membrane solution of 372 g of the secondary amine with a molecular weight of 372 (a total number of 25.3 carbon atoms) in a 1-liter graduated cylinder diluted to 900 ml with n-dodecane and then filled to the 1-liter mark with o-NPOE. As mentioned earlier, the module had a surface area of 1.4. The module was washed with water for a hour and run for 4 preliminary experiments using 2 liters of 500 ppm Cr(VI) feed solution and 1 liter of 2M NaOH strip solution. Then, the module was used for the set of 7 experiments using 6,000 ppm, 2,500 ppm, 500 ppm, 300 ppm, 100 ppm, 50 ppm and 4 ppm Cr(VI) feed solutions.

For each experiment, the feed solution in a volume of 2 liters was run in the single-pass mode of operation described in Example 1 and continued until either the pH of the strip solution dropped below 10 or the color of the feed solution indicated that the Cr(VI) concentrate had fallen below 1 ppm. Two pH meters were inserted in the feed and strip solutions so that the pH values could be measured before and after each pass. After each pass, 20 ml of sample was collected from each of the feed and strip solutions for the analysis of Cr(VI) and sulfate concentrations by ICP, and the pH of the feed solution was adjusted back down to 1.5 with 18M $H_2SO_4$ (usually about 1–1.75 ml). For pH 1.5, the sulfuric acid concentration in the feed solution was approximately 1,500 ppm. The sulfate concentration in the feed was also approximately 1,500 ppm for each experiment.

For each experiment, the feed flow rate was 0.84 liters/min. The strip solution was 0.5M NaOH except 2 M NaOH was used for the experiment using 2,500 ppm Cr(VI) feed solution. The strip solution was run at 1.8 liters/min in the recycle mode of operation, and it was in countercurrent flow to the feed solution. Between the runs with different Cr(VI) feed concentrations, the module was washed with water on the feed side and 1.5 M NaOH on the strip side to remove any possible contaminants from previous runs.

The flux of Cr(VI) through the SLM, determined via Eq. (3), as a function of Cr(VI) concentration in the feed is shown in FIG. 2. As shown in this figure, a carrier saturation phenomenon with a constant flax for the facilitated transport mechanism becomes evident when the feed Cr(VI) concentrations is 2,000 ppm or greater.

Sulfuric acid was used for the pH adjustment of the feed solution. However, the SLM also removes sulfuric acid in the similar facilitated transport mechanism shown in Eqs. (4) and (5). The sulfuric acid competes with the chromic acid in the feed solution for complexation with the amine in the membrane phase. The extraction of sulfuric acid into the strip solution is not desirable since it degrades the quality of the chromate recovered in the strip solution. However, we have unexpectedly found from these experiments that the flux of sulfuric acid depends on the Cr(VI) concentration in the feed (at pH 1.5). FIG. 3 shows the sulfuric acid flux, determined via Eq. (3), as a function of Cr(VI) concentration in the feed. The sulfuric acid flux reduces very significantly as the Cr(VI) concentration in the feed increases. The flux for a Cr(VI) concentration of greater than about 100 ppm is much less than that for a lower concentration.

As pointed out earlier, Eq. (6) defines the selectivity of chromic acid vs. sulfuric acid. We have found from these experiments that the selectivity is governed by the Cr(VI) concentration in feed as shown in FIG. 4. The selectivity increases from about 3 to 110 as the feed Cr(VI) concentration increases from 0 to about 4,300 ppm. For a higher concentration, the selectivity reduces as the constant Cr(VI) flux (at the carrier saturation) is divided by the higher Cr(VI) concentration as shown in Eq. (6).

The present invention is based on our findings with the unexpected results described above and is shown in FIGS. 2–4. Based on our findings, a high chromium flux combined with a high chromium/sulfate selectivity and a low sulfate flux is achievable with a Cr(VI) concentration greater than about 100 ppm. As mentioned earlier, the feed solution in Step (2) of the process of the present invention is a moderately concentrated Cr(VI) solution comprising 1,000 ppm to 20,000 ppm Cr(VI). In this Cr(VI) concentration range, the chromic acid flux and the chromic acid/sulfuric acid selectivity are high, and the sulfuric acid flux is very low. Thus, the resulting Strip (2) solution, i.e., the highly concentrated Cr(VI) solution (chromate) and the final product of this process, has a low sulfate concentration, giving the high quality of the chromate product.

EXAMPLE 8

Supported Liquid Membrane Step (1) of the Process Using Strip Dispersion Containing 10% Trilaurylamine and 2.5% o-NPOE In the SLM process, a strip dispersion was used instead of an aqueous strip solution. The strip dispersion was prepared by dispersing 0.25 liter of 2M NaOH solution in 0.75 liter of the organic membrane liquid comprising 10 wt. % trilaurylamine, 2.5 wt. % o-NPOE, and 87.5 wt. % n-dodecane. The dispersing operation was carried out by the use of a mixer with a 2-inch diameter, 6-blade high-shear impeller. The mixer was plugged into a varistat to allow for adjustable speed control, and it was set at 40% of the total output of the varistat during the run. When the mixing stopped, the strip dispersion separated into 2 phases, i.e., the organic membrane liquid on the top and the aqueous strip solution at the bottom.

The feed solution used was 2 liters of Cr(VI) (515 ppm) adjusted to pH 1.5 with sulfuric acid. Both the feed solution and the strip dispersion were run in the recycle mode described in Example 2 but countercurrently in a 2.5" diameter, 8" long module containing the microporous polypropylene hollow fibers described earlier. The feed solution flowed in the tube side of the module while the strip dispersion flowed in the shell side. A pressure differential of 10 psi between the feed and strip sides was maintained to prevent the organic membrane phase of the strip dispersion in the shell side from passing through the microporous hollow fibers into the feed solution in the tube side. The feed flow rate was 0.84 liter/min., and the strip dispersion flow rate was approximately 0.8 liter/min. During the run, the pH of the feed solution was maintained at 1.5 by the use of concentrated sulfuric acid (18M).

At 5 minutes into the run, the Cr(VI) concentration in the feed solution was reduced from 515 ppm to 222 ppm. Thus, the Cr(VI) flux determined via Eq. (3) was 5.02 g/m$^2$•h. At 40 minutes into the run, the Cr(VI) concentration in the feed solution reduced to 0.06 ppm, and that in the aqueous strip solution of the strip dispersion increased to 965 ppm. At 50 minutes into the run, the Cr(VI) concentration in aqueous strip solution of the strip dispersion further increased to 1,095 ppm. This run constituted the SLM step (1) of the process of the present invention.

EXAMPLE 9

Supported Liquid Membrane (1) of the Process

Using Strip Dispersion Containing 40% Trilaurylamine and 10% o-NPOE

The operating procedure for the SLM process was identical to that for Example 8 except the strip dispersion used. The strip dispersion was prepared by dispersing 0.33 liter of 2M NaOH solution in 0.66 liter of the organic membrane liquid comprising 40 wt. % of trilaurylamine, 10 wt. % of o-NPOE, and 50 wt. % of isoparaffinic hydrocarbon solvent (with a flash point of 92° C., a boiling point of 254° C., a viscosity of 3 cp (at 25° C.), and a density of 0.791 g/ml (at 15.6° C.)). At 5 minutes into the run, the Cr(VI) concentration in the feed solution was reduced from 490 ppm to 220 ppm. Thus, the Cr(VI) flux determined via Eq. (3) was 4.62 g/m$^2$•h. At 20 minutes into the run, the Cr(VI) concentration in the feed solution reduced to 1.3 ppm, and that in the aqueous strip solution of the strip dispersion increased to 705 ppm. At 50 minutes into the run, the Cr(VI) concentration in aqueous strip solution of the strip dispersion further increased to 1,894 ppm.

EXAMPLE 10

Supported Liquid Membrane Step (1) of the Process Using Strip Dispersion Containing Triisooctylamine and Dodecanol The operating procedure for the SLM process was identical to that for Examples 8 and 9 except the strip dispersion and the pressure differential used. The strip dispersion was prepared by dispersing 0.2 liter of 2 M NaOH aqueous strip solution in 0.6 liter of the organic membrane liquid comprising 16 wt. % of triisooctylamine, 2 wt. % of dodecanol, and 82 wt. % of the isoparaffinic hydrocarbon solvent described in Example 9. The pressure differential of 2.75 psi between the feed and strip sides was used. At 5 minutes into the run, the Cr(VI) concentration in the feed solution was reduced from 495 ppm to 158 ppm. Thus, the Cr(VI) flux was determined via Eq. (3) to be 5.73 g/m$^2$•h. At 15 minutes into the run, the Cr(VI) concentration in the feed solution was removed down to 21.4 ppm, and that in the aqueous strip solution of the strip dispersion increased to 2,018 ppm.

EXAMPLE 11

Supported Liquid Membrane Step (1) of the Process Using Strip Dispersion Containing 1 M Secondary Amine and 10% o-NPOE The operating procedure for the SLM process was the same as that for Examples 8 and 9 except the strip dispersion used. The strip dispersion was prepared by dispersing 0.33 liter of 2M NaOH solution in 0.666 liter of the organic membrane liquid comprising 1M of the secondary amine described and used in Examples 1–7 and 10 vol. % of o-NPOE in the isoparaffinic hydrocarbon solvent described in Example 9. At 5 minutes into the run, the Cr(VI) concentration in the feed solution was decreased from 497 ppm to 212 ppm. Thus, the Cr(VI) flux was determined via Eq. (3) to be 4.89 g/m$^2$•h. At 20 minutes into the run, the Cr(VI) concentration in the feed solution dropped to 6.1 ppm, and that in the aqueous strip solution of the strip dispersion increased to 2,334 ppm. At 25 minutes into the run, the Cr(VI) concentration in the feed solution further reduced to 3.9 ppm.

EXAMPLE 12

Supported Liquid Membrane Step (1) of the Process Using Strip Dispersion Containing 10% Secondary Amine and 2.5% o-NPOE The operating procedure for the SLM process was the same as that for Examples 8, 9, and 11 except the strip dispersion used. The strip dispersion was prepared by dispersing 0.25 liter of 2M NaOH solution in 0.75 liter of the organic membrane liquid comprising 10 wt. % of the secondary amine described and used in Examples 1–7, 2.5 wt. % of o-NPOE, and 87.5 wt. % of n-dodecane. At 5 minutes into the run, the Cr(VI) concentration in the feed solution was decreased from 521 ppm to 123 ppm. Thus, the Cr(VI) flux was determined via Eq. (3) to be 6.81 g/m$^2$•h. At 50 minutes into the run, the Cr(VI) concentration in the feed solution dropped to 0.3 ppm, and that in the aqueous strip solution of the strip dispersion increased to 2,811 ppm. This run constituted the SLM Step (1) of the process of the present invention.

EXAMPLE 13

Supported Liquid Membrane Step (1) of the Process Using Strip Dispersion Containing 10% Secondary Amine and 2.5% o-NPOE (99 ppm Cr (VI) Feed in Recycle Mode)

The operating procedure for the SLM process was similar to that for Examples 8, 9, 11, and 12 except the strip dispersion and the feed Cr(VI) concentration used. The strip dispersion was prepared by dispersing 0.06 liter (60 ml) of 2.5M NaOH solution in 0.74 liter of the organic membrane liquid comprising 10 wt. % of the secondary amine described in Examples 1–7, 2.5 wt. % of o-NPOE, and 87.5 wt. % of n-dodecane. The feed Cr(VI) concentration used was 99 ppm (The feed volume was 2 liters.). At 10 minutes into the run, the Cr(VI) concentration in the feed solution was decreased from 99 ppm to 2 ppm. Thus, the Cr(VI) flux was determined via Eq. (3) to be 0.828 g/m$^2$•h. At 30 minutes into the run, the Cr(VI) concentration in the feed solution dropped to 0.11 ppm, and that in the aqueous strip solution of the strip dispersion increased to 1,821 ppm. This feed was treated for additional 20 minutes by replacing the used aqueous strip solution with a fresh batch of the aqueous strip solution (0.06 liter or 60 ml of 2.5M NaOH). The additional treatment reduced the feed Cr(VI) concentration to 0.04 ppm and gave a Cr(VI) concentration of 389 ppm in the aqueous strip solution. This strip solution could be reused to treat a new batch of the feed. This run constituted the SLM Step (1) of the process of the present invention.

EXAMPLE 14

Supported Liquid Membrane Step (1) of the Process Using Strip Dispersion Containing 10% Secondary Amine and 2.5% o-NPOE (81 ppm Cr (VI) Feedin Single-Pass Mode)

The operating procedure for the SLM process was identical to that for Example 13 except the feed Cr(VI) concentration and the mode of operation used. The feed Cr(VI) concentration used was 81 ppm. The mode of operation was in the single-pass mode described in Example 1 for the feed. The feed solution at a flow rate of 0.84 liter/min and the strip dispersion at a flow rate of 1.2 liter/min flowed in the countercurrent mode. For the feed volume of 2 liters, each pass took 2.38 minutes (for the feed flow rate of 0.84 liter/min). At the end of the first pass, the Cr(VI) concentration in the feed solution was decreased from 81 ppm to 13.7 ppm. Thus, the Cr(VI) flux was determined via Eq. (3) to be 2.42 g/m²•h. At the end of the eleventh pass, the Cr(VI) concentration in the feed solution dropped to approximately 0.11 ppm, and that in the aqueous strip solution of the strip dispersion increased to 1,110 ppm. This feed was treated for additional 8 passes by replacing the used aqueous strip solution with a fresh batch of the aqueous strip solution (0.06 liter or 60 ml of 2.5M NaOH). The additional treatment reduced the feed Cr(VI) concentration to 0.049 ppm and gave a Cr(VI) concentration of 248 ppm in the aqueous strip solution. This strip solution could be reused to treat a new batch of the feed. This run constituted the SLM Step (1) of the process of the present invention.

EXAMPLE 15

Supported Liquid Membrane Step (1) of the Process Using Strip Dispersion Containing 10% Secondary Amine and 1% o-NPOE The operating procedure for the SLM process was identical to that for Examples 8, 9, 11, and 12 except the strip dispersion used. The strip dispersion was prepared by dispersing 0.2 liter of 2.5M NaOH solution in 0.8 liter of the organic membrane liquid comprising 10 wt. % of the secondary amine described in Examples 1–7, 1 wt. % of o-NPOE, and 89 wt. % of the isoparaffinic hydrocarbon solvent described in Example 9. At 5 minutes into the run, the Cr(VI) concentration in the feed solution was decreased from 487 ppm to 124 ppm. Thus, the Cr(VI) flux was determined via Eq. (3) to be 6.21 g/m²•h. At 30 minutes into the run, the Cr(VI) concentration in the feed solution dropped to 0.59 ppm, and that in the aqueous strip solution of the strip dispersion increased to 4,175 ppm. At 35 minutes into the run, the Cr(VI) concentration in the feed further reduced to 0.49 ppm. This run constituted the SLM Step (1) of the process of the present invention.

EXAMPLE 16

Supported Liquid Membrane Step (1) of the Process Using Strip Dispersion Containing 10% Secondary Amine and 1% Tributyl Phosphate The operating procedure for the SLM process was identical to that for Examples 8, 9, 11, 12, and 15 except the strip dispersion used. The strip dispersion was prepared by dispersing 0.2 liter of 2.5M NaOH solution in 0.8 liter of the organic membrane liquid comprising 10 wt. % of the secondary amine described in Examples 1–7, 1 wt. % of tributyl phosphate, and 89 wt. % of the isoparaffinic hydrocarbon solvent described in Example 9. At 5 minutes into the run, the Cr(VI) concentration in the feed solution was decreased from 459 ppm to 104 ppm. Thus, the Cr(VI) flux was determined via Eq. (3) to be 6.09 g/m²•h. At this time, the Cr(VI) concentration in the aqueous strip solution of the strip dispersion increased to 928 ppm from zero in the beginning of the process. At 10 minutes into the run, the Cr(VI) concentration in the feed solution dropped to 18.1 ppm, and that in the aqueous strip solution of the strip dispersion increased to 3,003 ppm.

EXAMPLE 17

Supported Liquid Membrane Step (2) of the Process Using Strip Dispersion Containing 10% Secondary Amine and 2.5% o-NPOE (6,604 ppm Cr(VI) Feed)

The operating procedure for the SLM process was identical to that for Examples 8, 9, 11, 12, 15, and 16 except the strip dispersion and feed solution used. The strip dispersion was prepared by dispersing 0.12 liter of 12.5M NaOH solution in 0.75 liter of the organic membrane liquid comprising 10 wt. % of the secondary amine described in Examples 1–7, 2.5 wt. % of o-NPOE, and 87.5 wt. % of the isoparaffinic hydrocarbon solvent described in Example 9. The feed solution in a volume of 8 liters comprised 6,604 ppm Cr(VI), 2,250 ppm sulfate, and 1,176 ppm sodium. At 30 minutes into the run, the Cr(VI) concentration in the feed solution was decreased from 6,604 ppm to 5,430 ppm. Thus, the Cr(VI) flux was determined via Eq. (3) to be 13.4 g/m²•h. At 60 minutes into the run, the Cr(VI) concentration in the feed solution dropped to 4,475 ppm, and that in the aqueous strip solution of the strip dispersion was 71,611 ppm. At 120 minutes into the run, the Cr(VI) concentration in the feed reduced to 2,889 ppm, and that in the aqueous strip solution of the strip dispersion increased to 130,774 ppm. At 180 minutes into the run, the Cr(VI) concentration in the feed dropped to 1,297 ppm, and that in the aqueous strip solution of the strip dispersion increased to 182,074 ppm. At 210 minutes into the run, the Cr(VI) concentration in the feed further dropped to 480 ppm, which was suitable for blending with the feed solution in Step (1) of the process (As mentioned earlier, the feed solution in Step (1) of the process was treated in Step (1) of the process.). At this time, the Cr(VI) concentration in the aqueous strip solution of the strip dispersion further increased to 200,758 ppm, which is equivalent to 62.5 wt. % $Na_2CrO_4$ and suitable for reuse or resale. This run constituted the SLM Step (2) of the process of the present invention.

What is claimed is:

1. A process for removal and recovery of chromium from a feed solution containing hexavalent chromium Cr(VI) comprising
   (1) in a first supported liquid membrane comprising an amine embedded in a microporous support material, treating a feed solution containing hexavalent chromium with a first strip solution to produce a moderately concentrated Cr(VI) solution comprising from 1,000 ppm to 20,000 ppm Cr(VI) and a treated feed solution comprising a chromium concentration of less than about 0.5 ppm; and
   (2) in a second supported liquid membrane comprising an amine embedded in a microporous support material, treating the moderately concentrated Cr(VI) solution with a second strip solution to produce a product solution comprising from 50,000 ppm to 300,000 ppm Cr(VI) and less than 100,000 ppm sulfate and to produce a treated solution, resulting from the moderately concentrated Cr(VI) solution, comprising an amount of chromium similar to the feed solution for recycling to this feed solution.

2. The process of claim 1 wherein sulfuric acid is added to the feed solution prior to its treatment.

3. The process of claim 1 wherein the highly concentrated Cr(VI) solution comprises between 50,000 ppm and 100,000 ppm sulfate.

4. The process of claim 1 wherein the amines in the supported liquid membranes are independently selected from the group consisting of primary, secondary, and tertiary amines having from 8 to 42 carbon atoms.

5. The process of claim 4 wherein the amines have from 16 to 32 carbon atoms.

6. The process of claim 5 wherein the amines have from 20 to 28 carbon atoms.

7. The process of claim 4 wherein the amines are independently selected from the group consisting of triisooctylamine, trioctylamine, trinonylamine, triisodecylamine, triundecylamine, trilaurylamine, diundecylamine, dilaurylamine, ditridecylamine, ditetradecylamine, the secondary amine having a molecular weight of 372 and a total number of 25.3 carbon atoms per amine molecule, and mixtures thereof.

8. The process of claim 1 wherein one or both of the supported liquid membranes further comprise a modifier in a hydrocarbon solvent or mixture.

9. The process of claim 8 wherein one or both of the supported liquid membranes comprise 2 wt. % to 100 wt. % amine and 0 wt. % to 20 wt. % modifier in a hydrocarbon solvent or mixture.

10. The process of claim 9 wherein one or both of the supported liquid membranes comprises 5 wt. % to 40 wt. % amine and 1 wt. % to 10 wt. % modifier in a hydrocarbon solvent or mixture.

11. The process of claim 8 wherein the modifier is selected from the group consisting of nitrophenyl alkyl ethers, alcohols, trialkyl phosphates, and mixtures thereof.

12. The process of claim 11 wherein the nitrophenyl alkyl ether is selected from the group consisting of o-nitrophenyl octyl ether (o-NPOE), o-nitrophenyl heptyl ether, o-nitrophenyl hexyl ether, o-nitrophenyl pentyl ether (o-NPPE), o-nitrophenyl butyl ether, o-nitrophenyl propyl ether, and mixtures thereof.

13. The process of claim 11 wherein the alcohol is selected from the group consisting of hexanol, heptanol, octanol, nonanol, decanol, undecanol, dodecanol, tridecanol, tetradecanol, pentadecanol, hexadecanol, heptadecanol, octadecanol, and mixtures thereof.

14. The method of claims 11 wherein the trialkyl phosphate is selected from the group consisting of tributyl phosphate, tris(2-ethylhexyl) phosphate, and mixtures thereof.

15. The method of claim 8 wherein the hydrocarbon solvent is selected from the group consisting of n-decane, n-undecane, n-dodecane, n-tridecane, n-tetradecane, isodecane, isoundecane, isododecane, isotridecane, isotetradecane, isoparaffinic hydrocarbon solvent and mixtures thereof.

16. The process of claim 1 wherein the microporous support materials of one or both of the supported liquid membranes are selected from the group consisting of polypropylene, polytetrafluoroethylene, polyethylene, polysulfone, polyethersulfone, polyetheretherketone, polyimide, polyamide and mixtures thereof.

17. The process of claim 1 wherein the first and second strip solutions are independently selected from the group consisting of an aqueous strip solution and a dispersion of an aqueous solution in an organic liquid comprising an amine.

18. The process of claim 17 wherein the aqueous strip solution comprises a base in water.

19. The process of claim 18 wherein the base is selected from the group consisting of sodium hydroxide, potassium hydroxide, lithium hydroxide, ammonium hydroxide, rubidium hydroxide, cesium hydroxide, beryllium hydroxide, magnesium hydroxide, calcium hydroxide, and mixtures thereof.

20. The process of claim 17 wherein the organic liquid of the strip dispersion comprises an amine selected from the group consisting of primary, secondary and tertiary amines, having from 8 to 42 carbon atoms.

21. The process of claim 20 wherein the amine has from 16 to 32 carbon atoms.

22. The process of claim 21 wherein the amine has from 22 to 28 carbon atoms.

23. The process of claim 20 wherein the amine is selected from the group consisting of triisooctylamine, trioctylamine, trinonylamine, triisodecylamine, triundecylamine, trilaurylamine, diundecylamine, dilaurylamine, ditridecylamine, ditetradecylamine, the secondary amine with a molecular weight of 372 and a total number of 25.3 carbon atoms per amine molecule, and mixtures thereof.

24. The process of claim 17 wherein the organic liquid of the strip dispersion further comprises a modifier selected from the group consisting of nitrophenyl alkyl ethers, alcohols, trialkyl phosphates, and mixtures thereof.

25. The process of claim 24 wherein the organic liquid of the strip dispersion comprises 2 wt. % to 100 wt. % amine and 0 wt. % to 20 wt. % modifier in a hydrocarbon solvent or mixture.

26. The process of claim 25 wherein the organic liquid of the strip dispersion comprises 5 wt. % to 40 wt. % amine and 1 wt. % to 10 wt. % modifier in a hydrocarbon solvent or mixture.

27. The process of claim 24 wherein the nitrophenyl alkyl ether is selected from the group consisting of o-nitrophenyl octyl ether (o-NPOE), o-nitrophenyl heptyl ether, o-nitrophenyl hexyl ether, o-nitrophenyl pentyl ether (o-NPPE), o-nitrophenyl butyl ether, o-nitrophenyl propyl ether, and mixtures thereof.

28. The process of claim 24 wherein the alcohol is selected from the group consisting of hexanol, heptanol, octanol, nonanol, decanol, undecanol, dodecanol, tridecanol, tetradecanol, pentadecanol, hexadecanol, heptadecanol, octadecanol, and mixtures thereof.

29. The process of claim 24 wherein the trialkyl phosphate is selected from the group consisting of tributyl phosphate, tris(2-ethylhexyl) phosphate, and mixtures thereof.

30. The process of claim 17 wherein the organic liquid of the strip dispersion further comprises a surfactant.

31. The process of claim 30 wherein the surfactant is selected from the group consisting of nonionic polyisobutylene-polyamine, sorbitan monooleate, sorbitan trioleate, sorbitan tristearate, sorbitan monostearate, sorbitan monopalmitate, sorbitan monolaurate, polyoxyethylene sorbitan trioleate, polyoxyethylene sorbitan tristearate and mixtures thereof.

* * * * *